US012790998B2

(12) United States Patent
Sakima et al.

(10) Patent No.: US 12,790,998 B2
(45) Date of Patent: Nov. 10, 2026

(54) FUEL REFORMING SYSTEM FOR VEHICLE

(71) Applicant: Mazda Motor Corporation, Hiroshima (JP)

(72) Inventors: Toshiaki Sakima, Aki-gun (JP); Yuji Harada, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 19/050,204

(22) Filed: Feb. 11, 2025

(65) Prior Publication Data

US 2025/0264075 A1 Aug. 21, 2025

(30) Foreign Application Priority Data

Feb. 15, 2024 (JP) ................................ 2024-021486

(51) Int. Cl.
*F02M 21/02* (2006.01)
*C01B 3/26* (2006.01)
*F02M 27/02* (2006.01)

(52) U.S. Cl.
CPC ........... *F02M 21/0227* (2013.01); *C01B 3/26* (2013.01); *F02M 21/0215* (2013.01); *F02M 27/02* (2013.01)

(58) Field of Classification Search
CPC ........... F02M 21/0206; F02M 21/0209; F02M 21/0212; F02D 13/0276; F02D 19/0644; F02D 19/0647; F02D 19/0671; F02B 75/021; F02B 2075/027; C01B 3/26; C01B 2203/066
See application file for complete search history.

(56) References Cited

U.S. PATENT DOCUMENTS 4,735,186 A * 4/1988 Parsons .................. F02M 27/02 123/3
6,397,790 B1 * 6/2002 Collier, Jr. .......... F02D 19/0671 123/3

(Continued)

FOREIGN PATENT DOCUMENTS

EP 2607454 A1 6/2013
JP 2005-147124 A 6/2005

(Continued)

OTHER PUBLICATIONS

Extended European Search Report issued May 8, 2025 in European Patent Application No. 25152304.9.

*Primary Examiner* — John M Zaleskas
(74) *Attorney, Agent, or Firm* — XSENSUS LLP

(57) ABSTRACT

A fuel reforming system for a vehicle includes a reciprocating engine mounted on a vehicle, a decomposer that decomposes a hydrocarbon fuel into carbon and a hydrogen gas and that stores the carbon, a hydrocarbon fuel supply unit that supplies the hydrocarbon fuel to the decomposer, and a hydrogen gas supply unit that supplies the hydrogen gas into a cylinder. The reciprocating engine performs a cycle including a compression stroke, an expansion stroke, and a re-compression stroke. The decomposer decomposes the hydrocarbon fuel into the carbon and the hydrogen gas utilizing the heat and the pressure of a combustion gas in the re-compression stroke. The decomposer includes a catalyst to which the carbon adheres and a water vapor adsorption portion in which water vapor is adsorbed.

10 Claims, 10 Drawing Sheets

(56) References Cited

U.S. PATENT DOCUMENTS

| | | | | |
|---|---|---|---|---|
| 7,207,323 | B1 * | 4/2007 | Hemsath | F01N 5/02 123/543 |
| 2002/0151604 | A1 * | 10/2002 | Detering | B01J 19/26 518/703 |
| 2007/0028905 | A1 * | 2/2007 | Shinagawa | C01B 3/26 123/575 |
| 2007/0251472 | A1 * | 11/2007 | Fiveland | F02B 41/04 123/64 |
| 2008/0202449 | A1 * | 8/2008 | Shimada | F02D 13/0276 123/3 |
| 2010/0175639 | A1 * | 7/2010 | Al-Dawood | B01D 53/005 123/3 |
| 2012/0166066 | A1 * | 6/2012 | Fiveland | F02B 75/021 701/104 |
| 2013/0143971 | A1 * | 6/2013 | Iwama | B01D 3/009 518/700 |
| 2014/0158071 | A1 * | 6/2014 | Svensson | F02B 75/021 123/64 |
| 2014/0377142 | A1 * | 12/2014 | Iwama | C10G 31/00 422/187 |
| 2017/0333843 | A1 * | 11/2017 | Aoyagi | C01B 3/384 |
| 2018/0010555 | A1 * | 1/2018 | Lee | F02M 26/09 |
| 2019/0048812 | A1 * | 2/2019 | Lundgren | F02D 19/061 |
| 2019/0120152 | A1 * | 4/2019 | Baek | F02M 26/36 |
| 2022/0315424 | A1 * | 10/2022 | Ashton | C01B 3/24 |
| 2023/0406701 | A1 | 12/2023 | Kiyosawa et al. | |
| 2025/0264076 | A1 * | 8/2025 | Horikoshi | F02D 13/0276 |
| 2025/0264077 | A1 * | 8/2025 | Iname | F02D 13/0276 |
| 2025/0264079 | A1 * | 8/2025 | Horikoshi | F02M 37/0023 |

FOREIGN PATENT DOCUMENTS

| | | | | | |
|---|---|---|---|---|---|
| JP | 2011007047 | A | * | 1/2011 | |
| JP | 2022-104521 | A | | 7/2022 | |
| WO | WO-2021014753 | A1 | * | 1/2021 | F02D 45/00 |

* cited by examiner

FUEL REFORMING SYSTEM FOR VEHICLE

CROSS-REFERENCE TO RELATED APPLICATION

The present application claims priority to Japanese application number 2024-021486 filed in the Japanese Patent Office on Feb. 15, 2024, the entire contents of which are incorporated herein by reference.

TECHNICAL FIELD

The present disclosure relates to a fuel reforming system for a vehicle.

BACKGROUND ART

Patent Literature 1 describes a decomposition apparatus that directly decomposes hydrocarbon into carbon and hydrogen.

This conventional decomposition apparatus includes a reactor in which a catalyst is accommodated. When a raw material gas containing hydrocarbon is supplied to the reactor, carbon adheres to the catalyst and a reactant gas containing hydrogen passes through the reactor. A hydrogen refining device on a downstream side relative to the reactor refines the hydrogen in the reactant gas to increase the hydrogen concentration.

CITATION LIST

Patent Literature

[Patent Literature 1] Japanese Patent Laid-Open No. 2022-104521

SUMMARY

Problems to be Solved by the Disclosure

In the technical field of a vehicle (for example, a four-wheel automobile), an approach for carbon neutrality has been sought. To realize carbon neutrality in a vehicle on which an engine using a hydrocarbon fuel (including gasoline and/or light oil) is mounted, a new technique of recovering carbon (C) or carbon dioxide (CO2) from the hydrocarbon fuel as well as improving the thermal efficiency and/or the exhaust emission performance of the engine is required.

In the vehicle on which the engine using the hydrocarbon fuel is mounted, when carbon or carbon dioxide is intended to be recovered, (1) recovery of carbon dioxide after combustion of the hydrocarbon fuel or (2) recovery of carbon by decomposing the hydrocarbon fuel into carbon and a hydrogen gas prior to combustion of the hydrocarbon fuel is conceived.

Considering that the recovered carbon dioxide or carbon is stored in the vehicle, since carbon dioxide is heavier than carbon (carbon is lighter than carbon dioxide), (2) (i.e., pre-combustion carbon recovery) is more advantageous than (1) (i.e., post-combustion recovery) in terms of the fuel efficiency of the vehicle. Further, in (2), it is also possible to use the hydrogen gas as fuel for the engine. There is also an advantage in that combustion of the hydrogen gas generates no oxide of carbon resulted from the combustion Thus, mounting the aforementioned conventional decomposition apparatus on a vehicle can be conceived.

The conventional decomposition apparatus includes a fluid bed reaction container. The reaction container accommodates a plurality of catalyst particles therein and a raw material gas is injected upward from a fluid bed toward the catalyst particles in the reaction container. Carbon that adheres to the catalyst particles is removed from the catalyst particles such that the catalyst particles are suspended in the raw material gas and the catalyst particles are rubbed against each other.

Further, the conventional decomposition apparatus includes a catalyst regenerating device outside a reactor. The catalyst regenerating device communicates with the reactor via a catalyst supply line and a catalyst return line. The catalyst regenerating device removes carbon from catalyst particles supplied from the reactor via the catalyst supply line and returns the catalyst particles with the carbon removed to the reactor via the catalyst return line.

The catalyst regenerating device is, for example, a rotary pipe that removes carbon from catalyst particles by agitating the catalyst particles to cause the catalyst particles to rub against each other, a catalyst dissolution device that removes carbon from catalyst particles by dissolving the catalyst particles, or a catalyst conversion device that removes carbon from catalyst particles by converting carbon into methane, carbon monoxide, or carbon dioxide using hydrogen, water vapor, and oxygen.

The conventional decomposition apparatus is inevitably enlarged or made in a complicated structure since it includes the aforementioned fluid bed or catalyst regenerating device as a carbon removing mechanism for removing carbon from a catalyst. In addition, in the conventional decomposition apparatus, a heating device to increase the temperature of a catalyst is essential. Therefore, it is difficult to mount the conventional decomposition apparatus on a vehicle.

Even if the decomposition apparatus can be mounted on a vehicle, there is a concern that in the decomposition apparatus mounted on the vehicle, carbon dioxide is generated due to steam reforming reaction and the associated water gas shift reaction derived from the water vapor in a combustion gas.

An aspect of the present disclosure is to achieve suppression of generation of carbon dioxide in a fuel reforming system mounted on a vehicle.

Means for Solving the Problems

A fuel reforming system for a vehicle according to the present disclosure includes: a reciprocating engine that is mounted on the vehicle and in which a piston reciprocates inside a cylinder; a decomposer that decomposes a hydrocarbon fuel into carbon and a hydrogen gas and that stores the carbon; a hydrocarbon fuel supply unit that supplies the hydrocarbon fuel to the decomposer; and a hydrogen gas supply unit that supplies the hydrogen gas produced by the decomposer into the cylinder, in which the reciprocating engine performs a cycle including at least a compression stroke in which an air-fuel mixture containing the hydrogen gas inside the cylinder is compressed with ascending of the piston, an expansion stroke in which the piston descends with combustion of the air-fuel mixture, and a re-compression stroke in which a combustion gas is compressed with ascending of the piston, the decomposer decomposes the hydrocarbon fuel supplied from the hydrocarbon fuel supply unit into the carbon and the hydrogen gas utilizing heat and pressure of the combustion gas in the re-compression stroke, and the decomposer includes: a catalyst to which the carbon adheres; and a water vapor adsorption portion in which water vapor is adsorbed.

The reciprocating engine includes the re-compression stroke in which a combustion gas is compressed with ascension of the piston, after the compression stroke and the expansion stroke. The hydrocarbon fuel supply unit supplies the hydrocarbon fuel to the decomposer.

The decomposer decomposes the hydrocarbon fuel into carbon and a hydrogen gas utilizing the heat and the pressure of the combustion gas in the re-compression stroke. The decomposer can efficiently decompose the hydrocarbon fuel. The carbon is stored in the decomposer.

The hydrogen gas supply unit supplies, as fuel, the hydrogen gas produced in the decomposer into the cylinder of the reciprocating engine. The reciprocating engine operates by combusting the hydrogen gas. An oxide of carbon resulting from the combustion is not generated. The reciprocating engine can supply the heat and the pressure to the decomposer for the decomposition of the hydrocarbon fuel while outputting the drive power for traveling a vehicle.

The fuel reforming system can realize carbon neutrality. The fuel reforming system utilizes the heat and the pressure derived from the reciprocating engine, and thus, does not require a separate dedicated device for generating the heat and/or the pressure necessary for the decomposition of the hydrocarbon fuel. The fuel reforming system is useful as an on-board system mounted on a vehicle.

Further, the decomposer includes the catalyst to which carbon adheres and the water vapor adsorption portion in which water vapor is adsorbed. Here, the water vapor is mixed in the combustion gas to be supplied to the decomposer in some cases.

In the decomposer, since the water vapor is adsorbed in the water vapor adsorption portion, adsorption of the water vapor in the catalyst is suppressed. In this manner, in the decomposer, a steam reforming reaction and an associated water gas shift reaction are suppressed, so that carbon dioxide is less likely to be generated.

As described above, generation of carbon dioxide can be suppressed in a fuel reforming system mounted on a vehicle.

In one embodiment, the water vapor adsorption portion is formed of a material that generates heat when the water vapor is adsorbed therein.

With such a configuration, a decomposition reaction that decomposes the hydrocarbon fuel into carbon and a hydrogen gas can be promoted with the heat generated when the water vapor is adsorbed in the water vapor adsorption portion.

In one embodiment, the water vapor adsorption portion is disposed next to the catalyst.

With such a configuration, it is possible to urge the water vapor to avoid being adsorbed in the catalyst, but adsorbed in the next water vapor adsorption portion.

In one embodiment, the decomposer includes a carrier, a recess and a projection that are next to each other are provided on a surface of the carrier, the catalyst is carried in one of the recess and the projection, and the water vapor adsorption portion is disposed in the other of the recess and the projection.

With such a configuration, by providing a step between the catalyst and the water vapor adsorption portion, the adsorption of the water vapor in the water vapor adsorption portion, separated from the catalyst, can be promoted more readily, so the adhesion of the carbon to the catalyst can be similarly promoted.

In one embodiment, the carrier is in a cylinder shape and carries the catalyst on an inner surface as the surface, the recess and the projection are provided on the inner surface, and the water vapor adsorption portion is positioned on an inner side relative to the catalyst.

With such a configuration, the water vapor adsorption portion contacts water vapor before the catalyst contacts the water vapor. In this manner, the water vapor can be adsorbed in the water vapor adsorption portion before the water vapor is adsorbed in the catalyst.

In one embodiment, the carrier forms the water vapor adsorption portion, the projection is exposed as the water vapor adsorption portion, and the recess is covered with the catalyst.

With such a configuration, it becomes easier to dispose the catalyst and the water vapor adsorption portion on the surface of the carrier.

Advantageous Effects

According to the present disclosure, generation of carbon dioxide can be suppressed in a fuel reforming system mounted on a vehicle.

MODE FOR CARRYING OUT DISCLOSED EMBODIMENTS

Hereinafter, embodiments of the present disclosure will be described in detail based on the drawings. The descriptions of the following preferred embodiments are substantially mere examples, and are utterly not intended to limit the present disclosure and targets of its application or its purpose.

First Embodiment (Fuel Reforming System)

Figure 1:
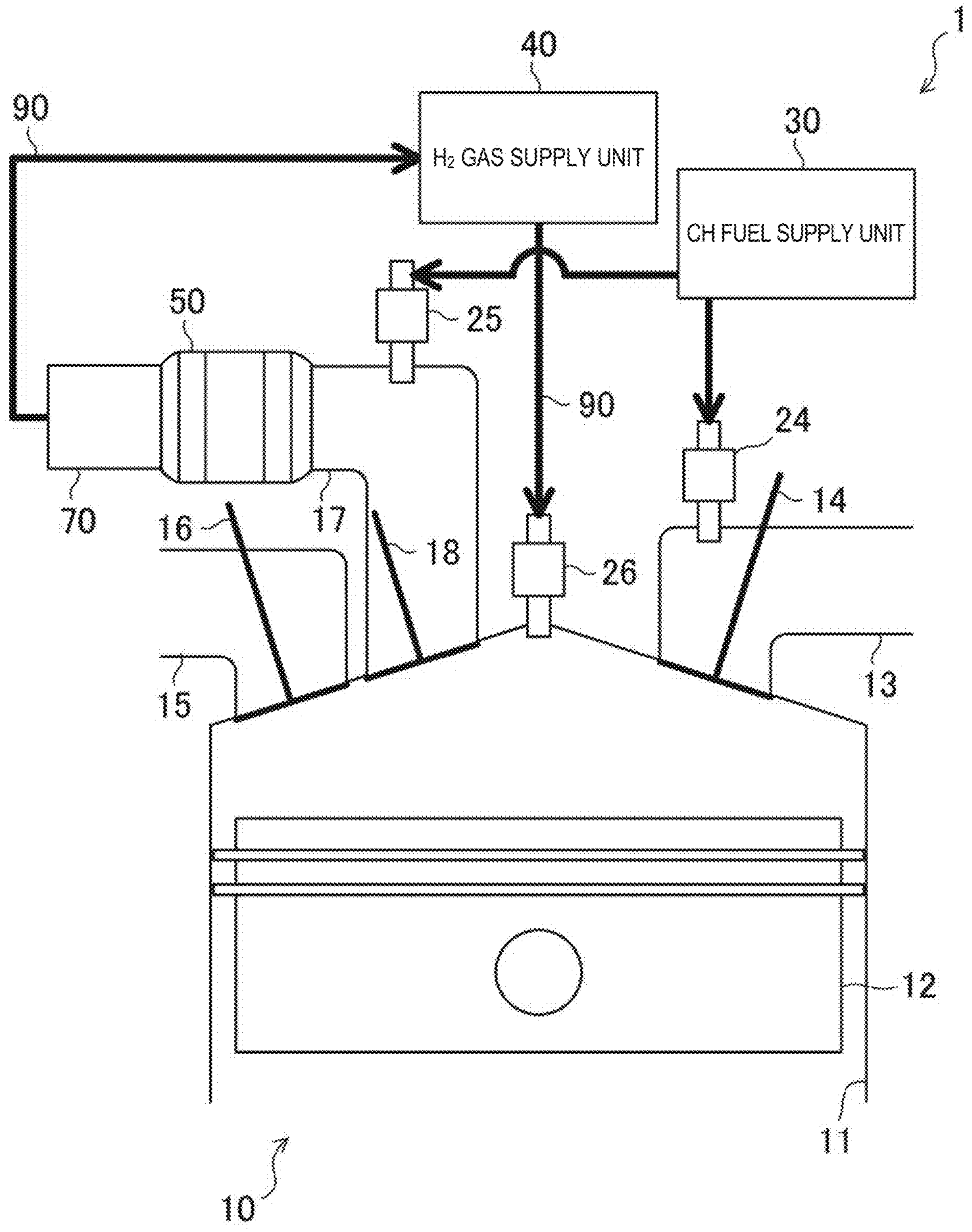
FIG. 1 shows a fuel reforming system.

The fuel reforming system 1 for a vehicle according to a first embodiment will be described. FIG. 1 shows the fuel reforming system 1. The fuel reforming system 1 is mounted on a vehicle. The vehicle is, for example, a four-wheel automobile or a two-wheel automobile. The fuel reforming system 1 decomposes a hydrocarbon fuel (CH fuel) into carbon (C) and a hydrogen gas (H2 gas) by way of a decomposer 50 described later. The carbon is stored in the decomposer 50. The hydrogen gas is used as fuel for a reciprocating engine 10. By virtue of this pre-combustion separation and isolation of carbon, the fuel reforming system 1 realizes carbon neutrality of a vehicle.

The fuel reforming system 1 for a vehicle includes the reciprocating engine 10, a hydrocarbon fuel supply unit 30 (sometimes referred to as a hydrocarbon fuel supply), a hydrogen gas supply unit 40 (sometimes referred to as a hydrogen gas supply), the decomposer 50, a carbon recovery unit 70 (sometimes referred to as a carbon recovery system), a control system 80, and a hydrogen gas passage 90.

(Reciprocating Engine)

The reciprocating engine 10 is mounted on a vehicle. The reciprocating engine 10 includes a cylinder 11, a piston 12, an intake port 13, an intake valve 14, an exhaust port 15, an exhaust valve 16, a reforming port 17, and an on-off valve 18.

The cylinder 11 includes a plurality of cylinders 11. The plurality of cylinders 11 are arranged, for example, in a direction in which a crankshaft of the reciprocating engine 10 extends. The piston 12 is accommodated in each cylinder 11. The piston 12 reciprocates inside the cylinder 11. The piston 12 is connected to the crankshaft via a connecting rod. The connecting rod converts the reciprocating movement of the piston 12 into the rotation of the crankshaft. The crankshaft is connected to driving wheels via a transmission. The reciprocating engine 10 outputs drive power for moving the vehicle. Note that the reciprocating engine 10 may be used as a drive source for driving a power generator.

The intake port 13 communicates with the cylinder 11. One or a plurality of intake ports 13 are connected to each cylinder 11. For example, two intake ports 13 are connected to each cylinder 11. The intake port 13 is connected to an intake pipe. Intake air is introduced into the cylinder 11 through the intake port 13. The intake air contains fresh air. The intake air may contain an EGR (Exhaust Gas Recirculation) gas. The intake valve 14 is a poppet valve that opens and closes the intake port 13. When the intake valve 14 opens, the intake air is introduced into the cylinder 11 through the intake port 13.

The exhaust port 15 communicates with the cylinder 11. One or a plurality of exhaust ports 15 are connected to each cylinder 11. For example, one exhaust port 15 may be connected to each cylinder 11. The exhaust port 15 is connected to an exhaust pipe. An exhaust gas is discharged from the inside of the cylinder 11 to the outside of the cylinder 11 through the exhaust port 15. The exhaust valve 16 is a poppet valve that opens and closes the exhaust port 15. When the exhaust valve 16 opens, the exhaust gas is discharged from the inside of the cylinder 11 to the outside of the cylinder 11 through the exhaust port 15.

The reforming port 17 communicates with the cylinder 11. At least one reforming port 17 is connected to each cylinder 11. For example, one reforming port 17 may be connected to each cylinder 11. The on-off valve 18 is a poppet valve and opens and closes the reforming port 17.

A typical reciprocating engine includes two intake ports and two exhaust ports for one cylinder. One of the two exhaust ports may be re-purposed for the reforming port 17. Alternatively, one of the two intake ports may be repurposed for the reforming port 17. In the present example, the reciprocating engine 10 includes two intake ports 13, one exhaust port 15, and one reforming port 17 for one cylinder 11. Note that for easier understanding, FIG. 1 illustrates the exhaust port 15 and the reforming port 17 at positions shifted from each other.

Figure 5:
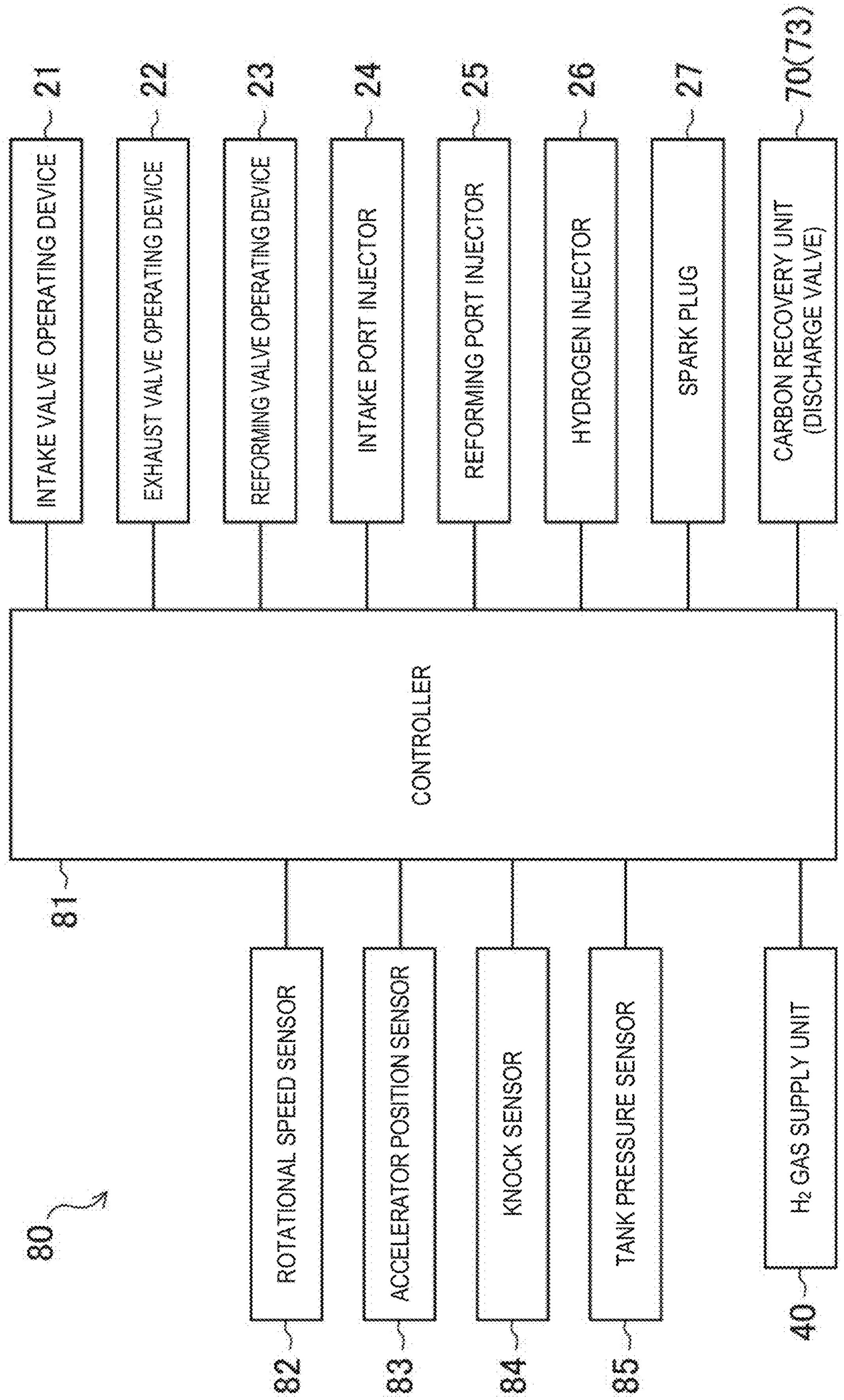
FIG. 5 shows a control system.

As shown in FIG. 5, the reciprocating engine 10 includes an intake valve operating device 21, an exhaust valve operating device 22, and a reforming valve operating device 23. The intake valve operating device 21 opens and closes the intake valve 14. The exhaust valve operating device 22 opens and closes the exhaust valve 16. The reforming valve operating device 23 opens and closes the on-off valve 18.

The intake valve operating device 21 and the exhaust valve operating device 22 include an intake camshaft and an exhaust camshaft mechanically connected to the intake valve 14 and the exhaust valve 16 and can continuously change the valve timing of the intake valve 14 and the exhaust valve 16 (so-called S-VT (Sequential-Valve Timing)). The intake valve operating device 21 and the exhaust valve operating device 22 can also continuously change the valve lifts of the intake valve 14 and the exhaust valve 16 (so-called CVVL (Continuously Variable Valve Lift)). The intake valve operating device 21 and the exhaust valve operating device 22 may adopt a publicly-known hydraulic or electric mechanism.

The reforming valve operating device 23 includes, for example, a reforming camshaft mechanically connected to the on-off valve 18. The reforming valve operating device 23 opens the on-off valve 18 twice during one cycle (see FIG. 6). The reforming valve operating device 23 can stop opening and closing the on-off valve 18. A publicly-known hydraulic or electric mechanism may be adopted for a valve stopping mechanism to stop opening and closing the on-off valve 18. The valve stopping mechanism may be, for example, incorporated into a rocker arm interposed between the reforming camshaft and the on-off valve 18. The valve stopping mechanism may be incorporated into a lash adjuster that supports the rocker arm. Note that the on-off valve 18 may be mechanically connected to the intake camshaft or the exhaust camshaft.

The reciprocating engine 10 includes an intake port injector 24, a reforming port injector 25, and a hydrogen injector 26. An injection hole of the intake port injector 24 faces the inside of the intake port 13. The intake port injector 24 injects the hydrocarbon fuel into the intake port 13. An injection hole of the reforming port injector 25 faces the inside of the reforming port 17. The reforming port injector 25 injects the hydrocarbon fuel into the reforming port 17. An injection hole of the hydrogen injector 26 faces the inside of the cylinder 11. The hydrogen injector 26 injects the hydrogen gas into the cylinder 11.

Note that the injector that injects the hydrocarbon fuel may face the inside of the cylinder 11 or the hydrogen injector that injects the hydrogen gas may face the inside of the intake port 13.

The reciprocating engine 10 includes a spark plug 27 (see FIG. 5). The spark plug 27 faces the inside of the cylinder 11. The spark plug 27 ignites an air-fuel mixture inside the cylinder 11.

(Hydrocarbon Fuel Supply Unit and Hydrogen Gas Supply Unit)

The hydrocarbon fuel supply unit 30 is mounted on a vehicle. The hydrocarbon fuel supply unit 30 is connected to the intake port injector 24. The hydrocarbon fuel supply unit 30 is also connected to the reforming port injector 25. The hydrocarbon fuel supply unit 30 selectively supplies the hydrocarbon fuel to the intake port injector 24 and the reforming port injector 25.

The hydrocarbon fuel supply unit 30 includes a fuel tank that stores the hydrocarbon fuel and a fuel pump that pumps the hydrocarbon fuel. In the fuel tank, the hydrocarbon fuel is stored. The hydrocarbon fuel is, for example, gasoline. The hydrocarbon fuel may be light oil. The hydrocarbon fuel may be another fuel.

As described above, the hydrocarbon fuel supply unit 30 supplies the hydrocarbon fuel to the reforming port injector 25. The reforming port injector 25 supplies the hydrocarbon fuel into the reforming port 17. The hydrocarbon fuel supplied into the reforming port 17 is supplied to the decomposer 50 described later. In short, the hydrocarbon fuel supply unit 30 supplies the hydrocarbon fuel to the decomposer 50 through the reforming port injector 25 and the reforming port 17.

The hydrogen gas supply unit 40 is mounted on a vehicle. The hydrogen gas supply unit 40 is connected to the hydrogen injector 26. The hydrogen gas supply unit 40 supplies a hydrogen gas to the hydrogen injector 26. As described above, the hydrogen gas is the hydrogen gas obtained by decomposing the hydrocarbon fuel. The configuration of the hydrogen gas supply unit 40 will be described later.

(Decomposer)

The decomposer 50 is mounted on a vehicle. The decomposer 50 is connected to the reforming port 17. The decomposer 50 is attached to each cylinder 11. The decomposer 50 may be shared in common by the plurality of cylinders 11. The decomposer 50 is a so-called membrane reactor.

Figure 2:
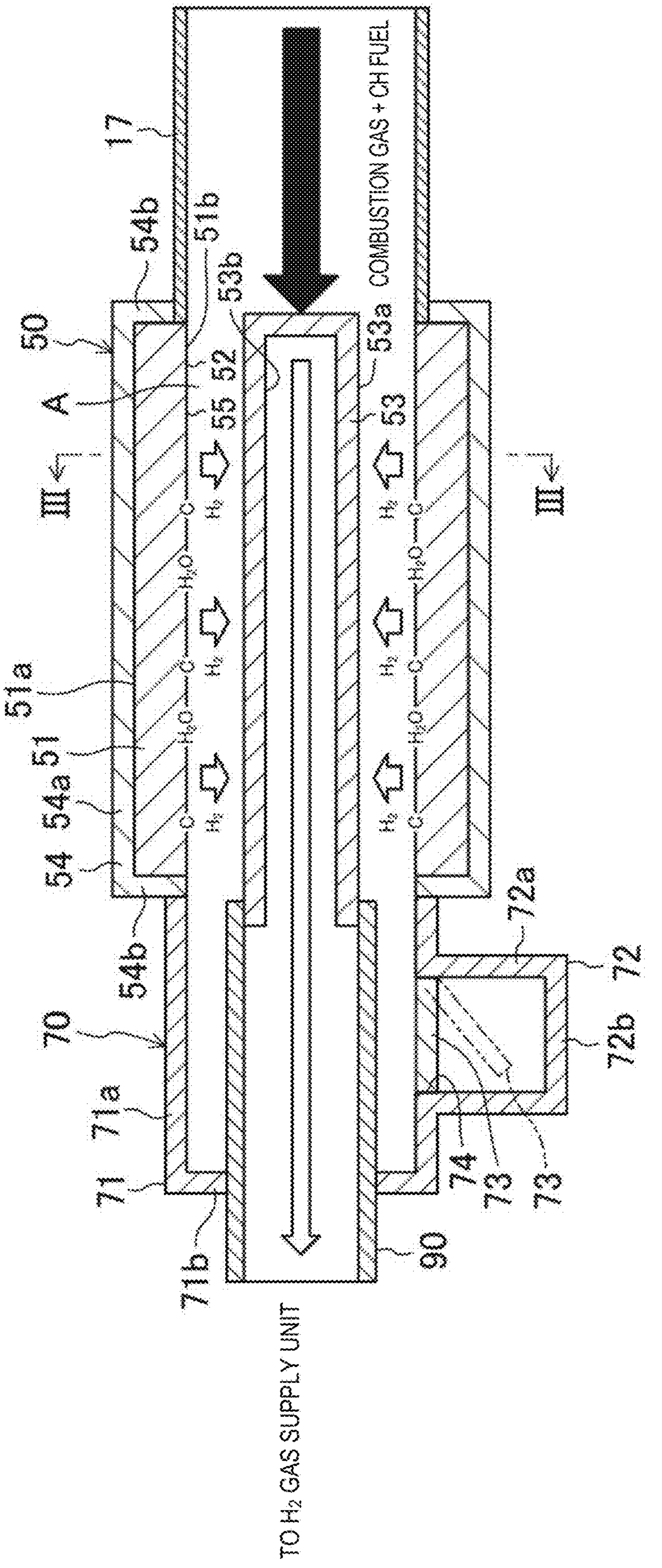
FIG. 2 shows a front-face cross-sectional view of a decomposer and a carbon recovery unit according to a first embodiment.
Figure 3:
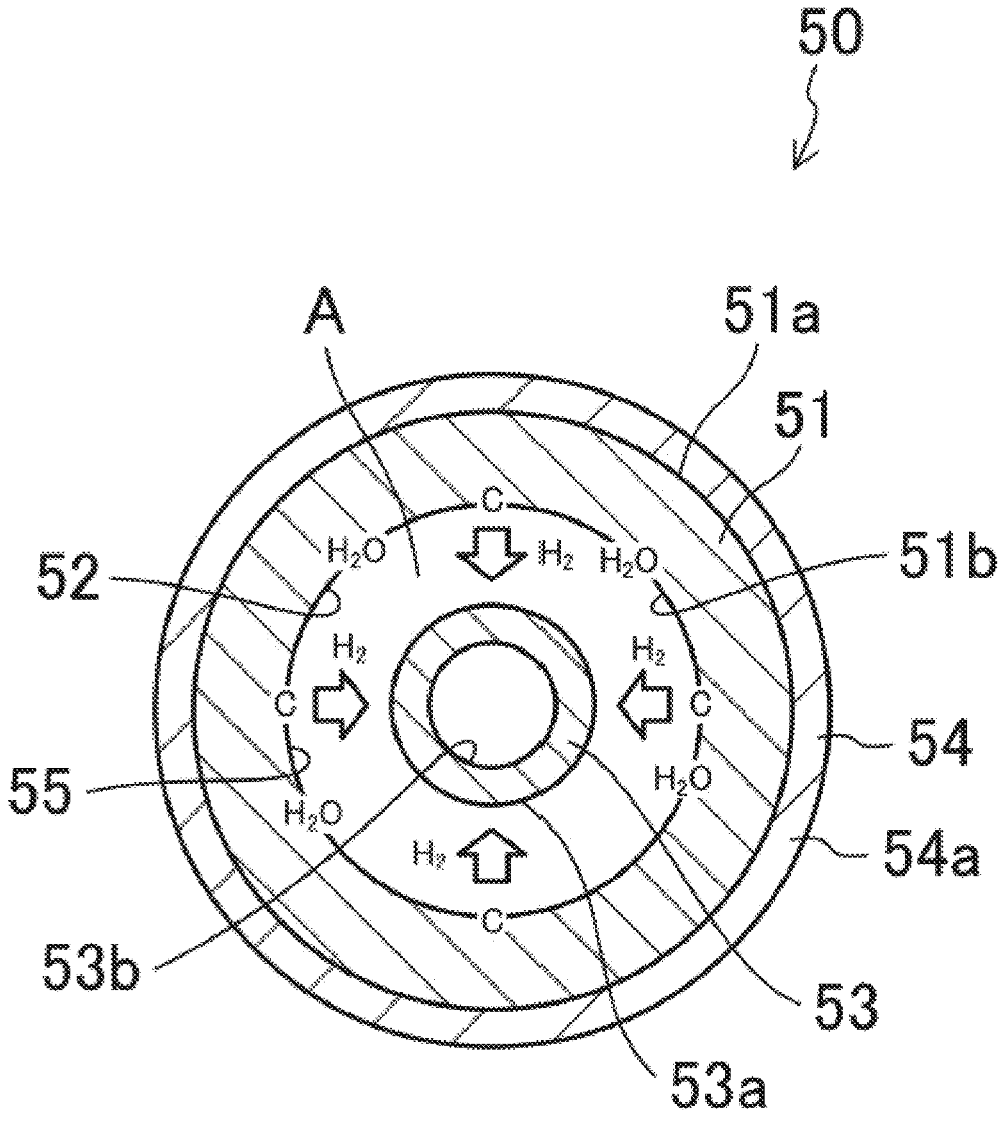
FIG. 3 shows a side-face cross-sectional view of the decomposer according to the first embodiment.

FIG. 2 shows a front-face cross-sectional view of the decomposer 50. FIG. 3 shows a side-face cross-sectional view of the decomposer 50 taken along line III. The decomposer 50 includes a carrier 51, a catalyst 52, a hydrogen separation membrane 53, a case 54, and a water vapor adsorption portion 55.

The carrier 51 is formed in a cylinder shape. The cylinder-shaped carrier 51 includes an outer surface 51*a* facing an outer circumferential side and an inner surface 51*b* as a surface facing an inner circumferential side. The carrier 51 is formed of, for example, ceramic. The carrier 51 may be formed of, for example, an aluminum oxide. The carrier 51 may also be formed of another material. The catalyst 52 is carried on the inner surface 51*b* of the cylinder-shaped carrier 51. In other words, the cylinder-shaped carrier 51 carries the catalyst 52 on the inner surface 51*b*. Specifically, the catalyst 52 is applied on a part or all of the inner surface 51*b* of the cylinder-shaped carrier 51.

Carbon of the hydrocarbon fuel adheres to the catalyst 52. The catalyst 52 is formed of, for example, an Ni—Al—Fe alloy. Note that as the catalyst 52, various catalysts to which carbon adheres may be adopted. Adhesion of carbon to the catalyst 52 is performed by a chemical reaction.

The hydrogen separation membrane 53 is formed in a cylinder shape. The cylinder-shaped hydrogen separation membrane 53 includes an outer surface 53*a* facing an outer circumferential side and an inner surface 53*b* facing an inner circumferential side. The hydrogen separation membrane 53 is disposed inside the carrier 51 (inner side relative to the inner surface 51*b* of the carrier 51). An outer diameter of the hydrogen separation membrane 53 is smaller than an inner diameter of the carrier 51. A gap A is formed between the inner surface 51*b* of the carrier 51 and the outer surface 53*a* of the hydrogen separation membrane 53. Only the hydrogen gas of the hydrocarbon fuel permeates through the hydrogen separation membrane 53. The hydrogen separation membrane 53 is formed of, for example, a Pd alloy. Note that the hydrogen separation membrane 53 is not limited to a Pd alloy membrane.

Hereinafter, the right side of FIG. 2 is referred to as one side and the left side of FIG. 2 is referred to as the other side. Note that the direction from one side toward the other side is a horizontal direction. The upper side of FIG. 2 is simply referred to as an upper side and the lower side of FIG. 2 is simply referred to as a lower side. One end of the carrier 51 is opened. One end of the carrier 51 is connected to (communicates with) the reforming port 17. The opening at one end of the carrier 51 faces the reforming port 17. The other end of the carrier 51 is opened. The other end of the carrier 51 is connected to (communicates with) the carbon recovery unit 70 described later. The opening at the other end of the carrier 51 faces the carbon recovery unit 70.

One end of the hydrogen separation membrane 53 is closed. One end of the hydrogen separation membrane 53 is recessed toward the other side relative to one end of the carrier 51. The other end of the hydrogen separation membrane 53 projects toward the other side relative to the other end of the carrier 51. The other end of the hydrogen separation membrane 53 is opened. The other end of the hydrogen separation membrane 53 is connected to (communicates with) the hydrogen gas passage 90 in a cylinder shape. An outer diameter of the other end of the hydrogen separation membrane 53 fits into an inner diameter of one end of the hydrogen gas passage 90. The opening at the other end of the hydrogen separation membrane 53 faces the hydrogen gas passage 90.

The hydrogen gas passage 90 connects the hydrogen separation membrane 53 and the hydrogen injector 26. In the middle of the hydrogen gas passage 90, the hydrogen gas supply unit 40 described later is connected (see FIG. 4).

The case 54 is formed in a substantially cylinder shape. The case 54 includes a cylinder portion 54*a* in a cylinder shape and an inwardly extending portion 54*b* extending from one end and the other end of the cylinder portion 54*a* toward the inner side. The cylinder portion 54*a* of the case 54 covers the outer surface 51*a* of the carrier 51. The inwardly extending portion 54*b* of the case 54 covers one end face and the other end face of the carrier 51. The case 54 retains the carrier 51 and the hydrogen separation membrane 53.

The hydrocarbon fuel, together with a combustion gas described later, is introduced (see a black arrow in FIG. 2) to the inside (inner side relative to the inner surface 51*b*) of the carrier 51 from the opening at one end of the carrier 51 through the reforming port 17. The hydrocarbon fuel flows through the gap A between the inner surface 51*b* of the carrier 51 and the outer surface 53*a* of the hydrogen separation membrane 53 from one side to the other side.

The carbon of the hydrocarbon fuel flowing through the gap A adheres to the catalyst 52 on the inner surface 51*b* of the carrier 51. The hydrogen gas of the hydrocarbon fuel flowing through the gap A passes through the hydrogen separation membrane 53 from the outer side toward the inner side to be introduced (see a white arrow in FIG. 2) to the inner side (inner side relative to the inner surface 53*b*) of the hydrogen separation membrane 53. The hydrogen gas flows through the inner side (inner side relative to the inner surface 53*b*) of the hydrogen separation membrane 53 toward the other side and passes through the hydrogen gas passage 90 to be supplied to the hydrogen gas supply unit 40 described later.

The hydrocarbon fuel is supplied from the hydrocarbon fuel supply unit 30 to the decomposer 50 through the reforming port injector 25 and the reforming port 17. The decomposer 50 decomposes the hydrocarbon fuel into carbon and a hydrogen gas by the carbon adhering to the catalyst 52 and the hydrogen gas passing through the hydrogen separation membrane 53. The decomposer 50 produces the carbon and the hydrogen gas that are decomposed from each other.

The decomposer 50 stores the carbon. Specifically, the carbon adhering to the catalyst 52 on the inner surface 51*b* of the carrier 51 remains as it is in the gap A between the inner surface 51*b* of the carrier 51 and the outer surface 53*a* of the hydrogen separation membrane 53.

Decomposition of the hydrocarbon fuel, as an example of isooctane, is represented by the following chemical reaction formula: iC8H18 (g)=8C(s)+9H2.

The water vapor adsorption portion 55 will be described later.

(Hydrogen Gas Supply Unit)

Figure 4:
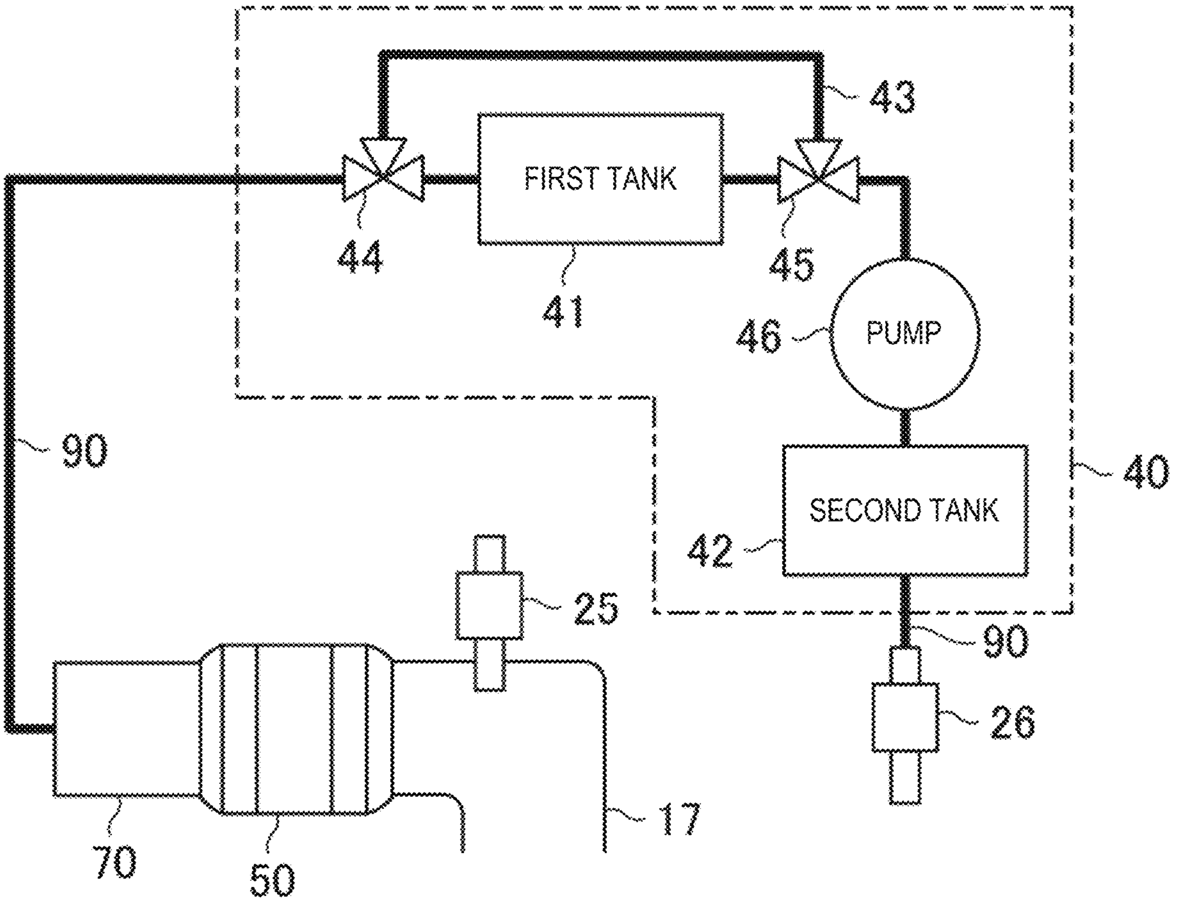
FIG. 4 shows a hydrogen gas supply unit.

FIG. 4 shows the hydrogen gas supply unit 40. Hereinafter, an upstream side (side of the decomposer 50) in a hydrogen gas flow is simply referred to as an upstream side and a downstream side (side of the hydrogen injector 26) in the hydrogen gas flow is simply referred to as a downstream side.

The hydrogen gas supply unit 40 is mounted on a vehicle. The hydrogen gas supply unit 40 is provided in the middle of the hydrogen gas passage 90. An upstream end of the hydrogen gas passage 90 is connected to the decomposer 50. As described above, the decomposer 50 produces a hydrogen gas. A downstream end of the hydrogen gas passage 90 is connected to the hydrogen injector 26. The hydrogen gas is supplied to the hydrogen gas supply unit 40 from the decomposer 50. The hydrogen gas supply unit 40 supplies the hydrogen gas to the hydrogen injector 26. The hydrogen injector 26 injects the hydrogen gas into the cylinder 11.

In short, the hydrogen gas supply unit 40 supplies the hydrogen gas produced by the decomposer 50 into the cylinder 11 through the hydrogen gas passage 90 and the hydrogen injector 26.

The hydrogen gas supply unit 40 may be shared in common by the plurality of cylinders 11. The hydrogen gas supply unit 40 may be provided for each cylinder 11. The hydrogen gas supply unit 40 includes a first tank 41, a second tank 42, a bypass passage 43, a first switching valve 44, a second switching valve 45, and a hydrogen pump 46.

The first tank 41 is connected to the hydrogen gas passage 90. The first tank 41 stores the hydrogen gas supplied from the decomposer 50.

The bypass passage 43 is formed of a part of the hydrogen gas passage 90 and bypasses the first tank 41. The first switching valve 44 is connected to the hydrogen gas passage 90 on the upstream side relative to the first tank 41. The second switching valve 45 is connected to the hydrogen gas passage 90 on the downstream side relative to the first tank 41. The first switching valve 44 and the second switching valve 45 switch a flow passage of the hydrogen gas between a side of the first tank 41 and a side of the bypass passage 43 upon reception of a control signal from a controller 81 described later.

The hydrogen pump 46 is connected to the hydrogen gas passage 90 on the downstream side relative to the second switching valve 45. The hydrogen pump 46 increases the pressure of the hydrogen gas. The second tank 42 is connected to the hydrogen gas passage 90 on a lower side relative to the hydrogen pump 46. The second tank 42 is positioned between the hydrogen pump 46 and the hydrogen injector 26 in the hydrogen gas passage 90. The second tank 42 stores a high-pressure hydrogen gas.

The pressure of the first tank 41 is lower than the pressure of the second tank 42. The low-pressure first tank 41 lowers the pressure on a secondary side of the hydrogen separation membrane 53 (pressure on the inner side relative to the inner surface 53*b* of the hydrogen separation membrane 53) as compared to the pressure on a primary side of the hydrogen separation membrane 53 (pressure in the gap A between the inner surface 51*b* of the carrier 51 and the outer surface 53*a* of the hydrogen separation membrane 53). The low-pressure first tank 41 increases the pressure difference between the primary side and the secondary side in the hydrogen separation membrane 53. A large pressure difference promotes permeation of the hydrogen gas through the hydrogen separation membrane 53. The hydrogen gas produced in the gap A (primary side) between the inner surface 51*b* of the carrier 51 and the outer surface 53*a* of the hydrogen separation membrane 53 rapidly permeates toward the inner side (secondary side) relative to the inner surface 53*b* of the hydrogen separation membrane 53 so that the decomposition reaction of the hydrocarbon fuel in the decomposer 50 is promoted.

A combination of the first tank 41 and the heat and the pressure of a combustion gas in a re-compression stroke S4 described later significantly promotes the decomposition reaction of the hydrocarbon fuel in the decomposer 50. Even when the decomposer 50 is compact, the promotion of the decomposition reaction of the hydrocarbon fuel makes it possible to secure the hydrogen gas in an amount required for operating the reciprocating engine 10.

Similarly, in a state of the flow passage of the hydrogen gas being switched to the side of the bypass passage 43, the pressure on the secondary side of the hydrogen separation membrane 53 is reduced due to driving of the hydrogen pump 46. The high-pressure second tank 42 can stably supply the high-pressure hydrogen gas to the hydrogen injector 26. The hydrogen injector 26 can inject the hydrogen gas into the cylinder 11 at timing near a compression top dead center at which the pressure inside the cylinder 11 is high. The hydrogen pump 46 enables the high-pressure hydrogen gas to be supplied to the hydrogen injector 26 while maintaining the pressure of the first tank 41 at low.

(Carbon Recovery Unit)

FIG. 2 shows a front-face cross-sectional view of the carbon recovery unit 70. The carbon recovery unit 70 is mounted on a vehicle. The carbon recovery unit 70 includes a housing 71, a discharge passage 72, and a discharge valve 73.

The housing 71 includes a cylinder portion 71*a* and a cover portion 71*b*. The cylinder portion 71*a* is in a cylinder shape. One end of the cylinder portion 71*a* of the housing 71 is connected to the other end of the carrier 51 via the inwardly extending portion 54*b* of the case 54. A portion at the other end of the hydrogen separation membrane 53 and a portion at one end of the hydrogen gas passage 90 are accommodated inside the cylinder portion 71*a* of the housing 71. A discharge hole 74 is formed on a lower portion of the cylinder portion 71*a* of the housing 71. The cover portion 71*b* covers an opening at the other end of the cylinder portion 71*a* of the housing 71. A through-hole is provided in the cover portion 71*b* of the housing 71. The hydrogen gas passage 90 extends through the through-hole of the cover portion 71*b* of the housing 71.

The discharge passage 72 includes a cylinder portion 72*a* and a cover portion 72*b*. The cylinder portion 72*a* of the discharge passage 72 is in a cylinder shape extending in an up-down direction. An upper end of the cylinder portion 72*a* of the discharge passage 72 is connected to the discharge hole 74 provided in the lower portion of the cylinder portion 71*a* of the housing 71. The cover portion 72*b* covers a lower end of the cylinder portion 72*a* in the discharge passage 72. The carbon removed from the catalyst 52 of the decomposer 50 is discharged to the discharge passage 72. The carbon discharged to the discharge passage 72 is stored in the discharge passage 72.

The discharge valve 73 opens and closes the discharge passage 72. Specifically, the discharge valve 73 opens and closes the discharge hole 74 (connecting portion between the housing 71 and the discharge passage 72) in the lower portion of the cylinder portion 71*a* of the housing 71. When the discharge valve 73 closes the discharge passage 72, an inner space of the discharge passage 72 does not communicate with an inner space of the housing 71. When the discharge valve 73 opens the discharge passage 72, the inner space of the discharge passage 72 communicates with the inner space of the housing 71.

The carbon recovery unit 70 recovers the carbon produced in the decomposer 50. In particular, the carbon recovery unit 70 recovers the carbon removed from the catalyst 52 of the decomposer 50. The carbon discharged to the discharge passage 72 of the carbon recovery unit 70 is taken out from a vehicle during, for example, maintenance check of the vehicle. The carbon taken out is reusable as a recycled product.

(Control System)

FIG. 5 shows a block diagram of the control system 80. The control system 80 includes the controller 81. The controller 81 is composed of hardware such as a processor, a memory, and an interface, and software such as a database and a control program. Moreover, the processor may be one or more programmable processors (e.g., CPUs and/or GPUs) that are configured by execution of stored computer readable code, or hardwired processors such as application specific integrated circuit(s) (ASICs) and/or programmable array logic (PAL), or a combination of one or more software configurable processor(s) and one or more hardwired processor(s).

A rotational speed sensor 82 is electrically connected to the controller 81. The rotational speed sensor 82 is attached to the reciprocating engine 10. The rotational speed sensor 82 outputs a measurement signal corresponding to the rotational speed of the crankshaft to the controller 81. The controller 81 can identify the rotational speed of the reciprocating engine 10 based on the measurement signal from the rotational speed sensor 82.

An accelerator position sensor 83 is electrically connected to the controller 81. The accelerator position sensor 83 is attached to an accelerator pedal. The accelerator position sensor 83 outputs a signal corresponding to a depression amount of the accelerator pedal to the controller 81. The controller 81 can identify a required load of the reciprocating engine 10 based on the measurement signal from the accelerator position sensor 83.

A knock sensor 84 is electrically connected to the controller 81. The knock sensor 84 is attached to the reciprocating engine 10. When a knock is generated in the reciprocating engine 10, the knock sensor 84 outputs a knock detection signal to the controller 81. The controller 81 can identify the generation of the knock based on the knock detection signal.

A tank pressure sensor 85 is electrically connected to the controller 81. The tank pressure sensor 85 is attached to the second tank 42 of the hydrogen gas supply unit 40. The tank pressure sensor 85 outputs a signal corresponding to a hydrogen gas amount in the second tank 42 to the controller 81. The controller 81 can determine the hydrogen gas amount that can be supplied to the cylinder 11, based on the signal from the tank pressure sensor 85.

The intake valve operating device 21, the exhaust valve operating device 22, and the reforming valve operating device 23 are electrically connected to the controller 81. The controller 81 outputs a control signal to the intake valve operating device 21, the exhaust valve operating device 22, and the reforming valve operating device 23 in accordance with the operating conditions of the reciprocating engine 10. The intake valve operating device 21 changes the valve timing and/or the valve lift of the intake valve 14 based on the control signal from the controller 81. The exhaust valve operating device 22 changes the valve timing and/or the valve lift of the exhaust valve 16 based on the control signal from the controller 81. The reforming valve operating device 23 switches between opening/closing and stopping of the on-off valve 18 based on the control signal from the controller 81.

The intake port injector 24, the reforming port injector 25, and the hydrogen injector 26 are electrically connected to the controller 81. The controller 81 outputs a control signal to the intake port injector 24, the reforming port injector 25, and the hydrogen injector 26. The intake port injector 24 injects the hydrocarbon fuel in a predetermined amount into the intake port 13 at predetermined timing based on the control signal from the controller 81. The reforming port injector 25 injects the hydrocarbon fuel in a predetermined amount into the reforming port 17 at predetermined timing based on the control signal from the controller 81. The hydrogen injector 26 injects the hydrogen gas in a predetermined amount into the cylinder 11 at predetermined timing based on the control signal from the controller 81.

The spark plug 27 is electrically connected to the controller 81. The spark plug 27 is attached to the reciprocating engine 10. The controller 81 outputs a control signal to the spark plug 27. The spark plug 27 ignites an air-fuel mixture inside the cylinder 11 at predetermined timing based on the control signal from the controller 81.

The hydrogen gas supply unit 40 is electrically connected to the controller 81. The controller 81 outputs a control signal to the first switching valve 44, the second switching valve 45, and the hydrogen pump 46 of the hydrogen gas supply unit 40.

The discharge valve 73 of the carbon recovery unit 70 is electrically connected to the controller 81. The controller 81 outputs a control signal to the discharge valve 73 of the carbon recovery unit 70. The discharge valve 73 of the carbon recovery unit 70 opens and closes the discharge passage 72 of the carbon recovery unit 70 based on the control signal from the controller 81.

(Six-Stroke Cycle)

Figure 6:
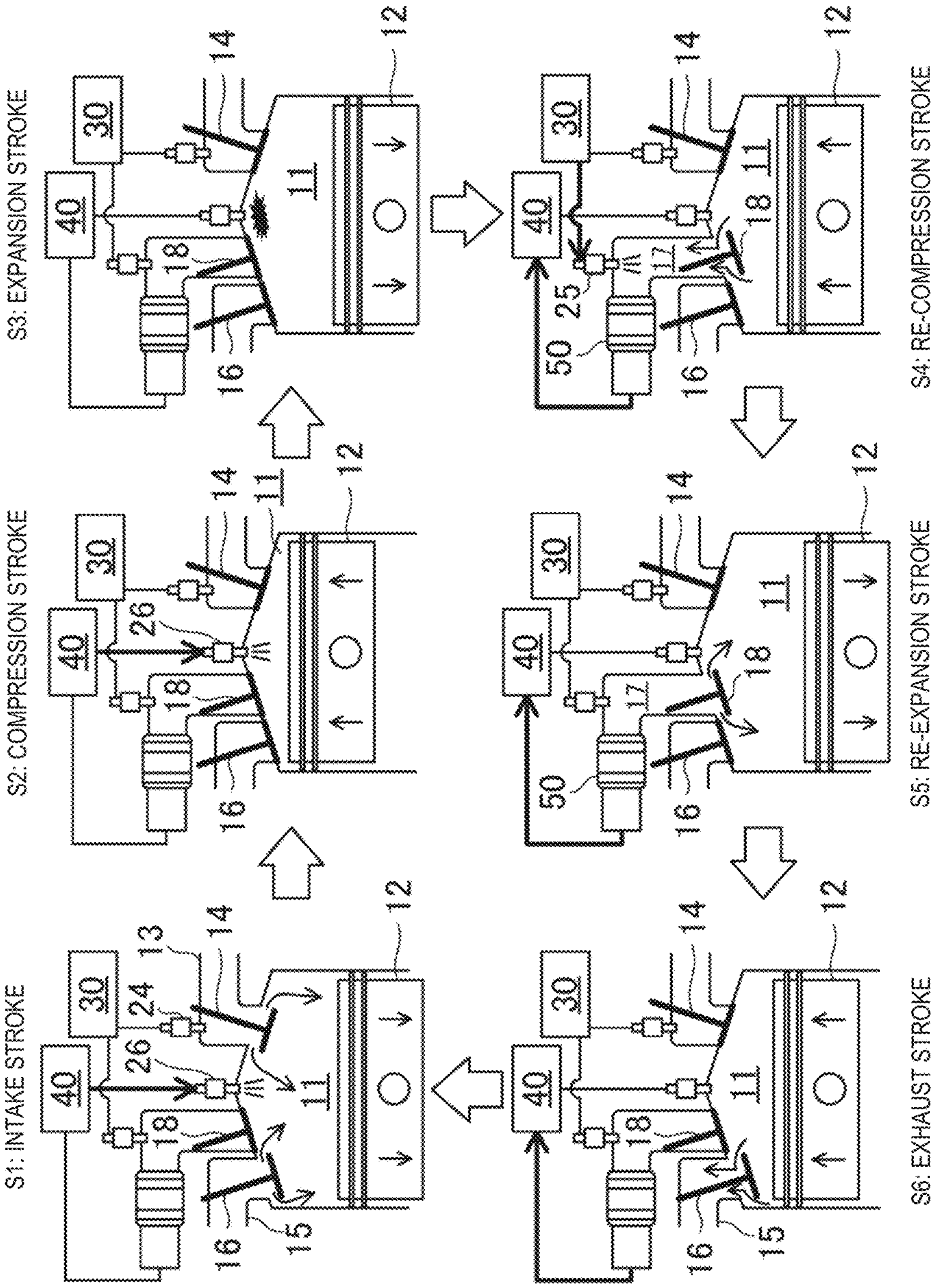
FIG. 6 shows each stroke of a six-stroke cycle according to the first embodiment.

The reciprocating engine 10 performs a six-stroke cycle so that the decomposer 50 performs decomposition of a hydrocarbon fuel. FIG. 6 shows each stroke of the six-stroke cycle. The six-stroke cycle includes an intake stroke S1, a compression stroke S2, an expansion stroke S3, the re-compression stroke S4, a re-expansion stroke S5, and an exhaust stroke S6.

In the intake stroke S1, intake air is introduced into the cylinder 11 with descending of the piston 12. In the intake stroke S1, the intake valve 14 opens. The intake air is introduced into the cylinder 11 through the intake port 13. The intake air contains fresh air. The intake air may contain an EGR gas. The EGR gas is an external EGR gas, which is circulated into the intake pipe through an EGR passage. In the intake stroke S1, the exhaust valve 16 may open. When the exhaust valve 16 opens, an exhaust gas is introduced into the cylinder 11 through the exhaust port 15. The exhaust gas introduced into the cylinder 11 is an internal EGR gas. The on-off valve 18 of the reforming port 17 is closed.

During the intake stroke S1, the hydrogen injector 26 (hydrogen gas supply unit 40) injects (supplies) a hydrogen gas into the cylinder 11. In the compression stroke S2 subsequent to the intake stroke S1, the hydrogen injector 26 may inject the hydrogen gas. Over the period from the intake stroke S1 to the compression stroke S2, the hydrogen injector 26 may inject the hydrogen gas. An air-fuel mixture in which the hydrogen gas and the intake air (air) are mixed is produced inside the cylinder 11.

When the hydrogen gas is in short supply, in the intake stroke S1, the intake port injector 24 may inject the hydrocarbon fuel to the intake port 13 so as to complement the shortage. When there is no hydrogen gas, the intake port injector 24, in place of the hydrogen injector 26, may inject the hydrocarbon fuel to the intake port 13 in the intake stroke S1. When the hydrogen gas to be supplied into the cylinder 11 is in short supply, the intake port injector 24 injects the hydrocarbon fuel so that a necessary fuel amount of the reciprocating engine 10 is secured. The reciprocating engine 10 can operate using the hydrocarbon fuel or both the hydrocarbon fuel and the hydrogen gas.

In the compression stroke S2, the air-fuel mixture containing the hydrogen gas inside the cylinder 11 is compressed with ascending of the piston 12. In the compression stroke S2, the intake valve 14, the exhaust valve 16, and the on-off valve 18 are all closed.

The spark plug 27 ignites the air-fuel mixture inside the cylinder 11 at timing near a compression top dead center. The air-fuel mixture starts combustion. In the expansion stroke S3, the piston 12 descends with the combustion of the air-fuel mixture. In the expansion stroke S3, the intake valve 14, the exhaust valve 16, and the on-off valve 18 are all closed.

In the re-compression stroke S4, a combustion gas inside the cylinder 11 is compressed with ascending of the piston 12. In the re-compression stroke S4, the on-off valve 18 opens. In the re-compression stroke S4, the compressed combustion gas is introduced into the decomposer 50 through the reforming port 17. In the re-compression stroke S4, the reforming port injector 25 injects the hydrocarbon fuel into the reforming port 17. The hydrocarbon fuel, together with the combustion gas, is introduced into the decomposer 50. Specifically, in the re-compression stroke S4, the hydrocarbon fuel is supplied from the hydrocarbon fuel supply unit 30 to the decomposer 50 via the reforming port injector 25 and the reforming port 17, and the combustion gas is supplied from the inside of the cylinder 11 to the decomposer 50 via the reforming port 17.

In the re-compression stroke S4, in the decomposer 50, the hydrocarbon fuel is decomposed into carbon and a hydrogen gas by means of the heat of the combustion gas and the catalyst 52. The carbon adheres to the catalyst 52 and is stored in the decomposer 50. In the re-compression stroke S4, the hydrogen gas permeates through the hydrogen separation membrane 53 of the decomposer 50 to be delivered to the hydrogen gas supply unit 40 via the hydrogen gas passage 90 by means of the pressure of the combustion gas.

Since the high pressure of the combustion gas in the re-compression stroke S4 is applied to the decomposer 50 (specifically, the gap A between the inner surface 51*b* of the carrier 51 and the outer surface 53*a* of the hydrogen separation membrane 53), the hydrogen gas produced in the decomposer 50 (gap A) rapidly permeates through the hydrogen separation membrane 53 to be delivered to the inner side (specifically, inner side relative to the inner surface 53*b* of the hydrogen separation membrane 53) of the hydrogen separation membrane 53.

In this manner, the decomposer 50 decomposes the hydrocarbon fuel supplied from the hydrocarbon fuel supply unit 30 (via the reforming port injector 25 and the reforming port 17) into the carbon and the hydrogen gas utilizing the heat and the pressure of the combustion gas in the re-compression stroke S4. This promotes the decomposition reaction of the hydrocarbon fuel in the decomposer 50. The decomposer 50, which is even compact, utilizing the heat and the pressure in the re-compression stroke S4 of the reciprocating engine 10 can produce the hydrogen gas in an amount required for operating the reciprocating engine 10.

In the re-expansion stroke S5, the piston 12 descends. In the re-expansion stroke S5, the on-off valve 18 may open. When the on-off valve 18 opens, the combustion gas with the carbon and the hydrogen gas removed is introduced into the cylinder 11 from the decomposer 50 through the reforming port 17. Opening of the on-off valve 18 in the re-expansion stroke S5 is advantageous in reducing a pumping loss of the reciprocating engine 10.

In the exhaust stroke S6, the combustion gas inside the cylinder 11 is discharged through the exhaust port 15 with ascending of the piston 12. In the exhaust stroke S6, the exhaust valve 16 opens. Note that in the exhaust stroke S6, the intake valve 14 and the on-off valve 18 are closed.

After the exhaust stroke S6, the reciprocating engine 10 returns to the intake stroke S1.

Note that instead of opening of the on-off valve 18 in the re-expansion stroke S5 or along with opening of the on-off valve 18 in the re-expansion stroke S5, the on-off valve 18 may open in the intake stroke S1. When the on-off valve 18 opens in the intake stroke S1, the combustion gas with the carbon and the hydrogen gas removed is introduced into the cylinder 11 from the decomposer 50 via the reforming port 17. The combustion gas becomes an EGR gas.

In the re-expansion stroke S5, when the on-off valve 18 is closed, since the hydrocarbon fuel introduced into the decomposer 50 in the re-compression stroke S4 remains in the decomposer 50 for a long period of time, an advantage of promoting the decomposition reaction of the hydrocarbon fuel can be obtained.

In this manner, the fuel reforming system 1 including the reciprocating engine 10 that performs the six-stroke cycle stores, in the decomposer 50, the carbon produced by the decomposition of the hydrocarbon fuel. Since the reciprocating engine 10 combusts the hydrogen gas produced by the decomposition of the hydrocarbon fuel, an oxide of carbon resulted from the combustion is not generated. The fuel reforming system 1 can realize carbon neutrality.

The fuel reforming system 1 utilizes the heat and the pressure derived from the reciprocating engine 10, and thus, does not require a separate dedicated device for generating the heat and/or the pressure necessary for the decomposition of the hydrocarbon fuel. The fuel reforming system 1 is useful as an on-board system.

(Water Vapor Adsorption Portion)

Figure 7:
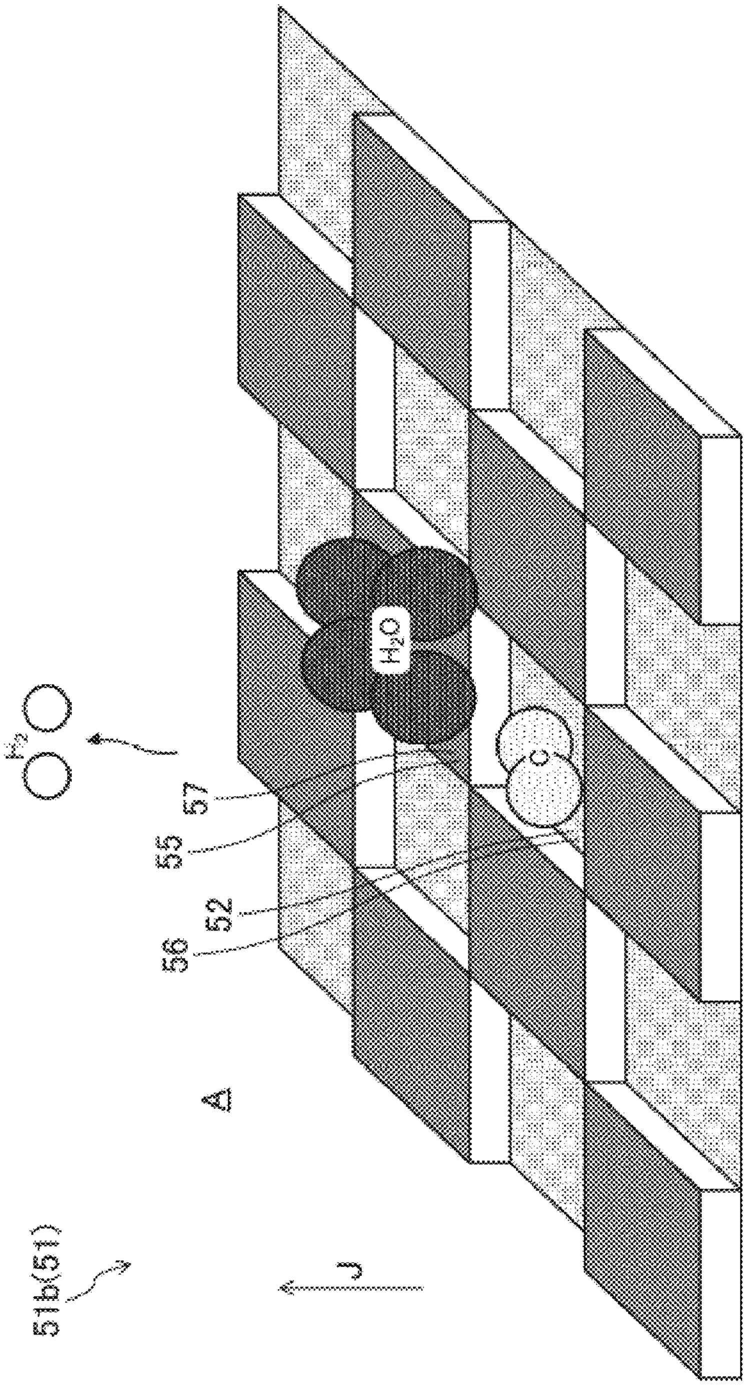
FIG. 7 schematically shows an inner surface of a carrier of the decomposer according to the first embodiment.

FIG. 7 schematically shows the inner surface 51*b* of the carrier 51 in the decomposer 50. Note that FIG. 7 shows a micro region as compared to FIGS. 2 and 3.

The carrier 51 is in a cylinder shape. A recess 56 and a projection 57 are provided on the inner surface 51*b* as a surface of the carrier 51. The recess 56 and the projection 57 are next to each other on the inner surface 51*b* of the carrier 51. Specifically, the recess 56 and the projection 57 are adjacent to each other on the inner surface 51*b* of the carrier 51. The recess 56 is recessed to the inner side on the inner surface 51*b* of the carrier 51. The projection 57 projects to the outer side on the inner surface 51*b* of the carrier 51.

The catalyst 52 is carried in the recess 56 on the inner surface 51*b* of the carrier 51. The water vapor adsorption portion 55 is disposed in the projection 57 on the inner surface 51*b* of the carrier 51. Specifically, the water vapor adsorption portion 55 is applied on the projection 57 on the inner surface 51*b* of the carrier 51. The water vapor adsorption portion 55 is in a film form that is formed on the inner surface 51*b* of the carrier 51.

The catalyst 52 in the recess 56 on the inner surface 51*b* of the carrier 51 and the water vapor adsorption portion 55 in the projection 57 on the inner surface 51*b* of the carrier 51 are next to each other. In other words, on the inner surface 51*b* of the carrier 51, the water vapor adsorption portion 55 is disposed so as to be next to the catalyst 52. Conversely, on the inner surface 51*b* of the carrier 51, the catalyst 52 is disposed so as to be next to the water vapor adsorption portion 55.

The water vapor adsorption portion 55 in the projection 57 on the inner surface 51*b* of the cylinder-shaped carrier 51 is positioned on the inner side (inner circumferential side, a side of the gap A denoted by J) relative to the catalyst 52 in the recess 56 on the inner surface 51*b* of the cylinder-shaped carrier 51.

The water vapor adsorption portion 55 in the projection 57 on the inner surface 51*b* of the cylinder-shaped carrier 51 is positioned closer to the gap A, where the hydrocarbon fuel and the combustion gas are supplied, relative to the catalyst 52 in the recess 56 on the inner surface 51*b* of the cylinder-shaped carrier 51. The water vapor adsorption portion 55 contacts the hydrocarbon fuel, the combustion gas, and the water vapor described later, before the catalyst 52 contacts the water vapor.

As described above, carbon (C) of the hydrocarbon fuel (CH fuel) adheres to the catalyst 52. In this manner, the carbon (C) and the hydrogen gas (H2 gas) are decomposed from the hydrocarbon fuel (CH fuel).

As described above, in the re-compression stroke S4, the hydrocarbon fuel (CH fuel) and the combustion gas are supplied to the decomposer 50 (specifically, the gap A between the inner surface 51*b* of the carrier 51 and the outer surface 53*a* of the hydrogen separation membrane 53). At this time, water vapor (H2O) is mixed in the combustion gas in some cases. In other words, the water vapor (H2O) in addition to the hydrocarbon fuel (CH fuel) and the combustion gas is present in the decomposer 50. Further, not only the carbon (C), but also the water vapor (H2O) adheres to the catalyst 52 in some cases.

In a case where water vapor (H2O) is present in a large amount in the decomposer 50, when the water vapor (H2O) adheres to the catalyst 52, the steam reforming reaction and the associated water gas shift reaction that are represented by the following chemical reaction formulae occur, thereby generating carbon dioxide (CO2). C8H18+8H2O=8CO+17H2 (steam reforming reaction). CO+H2O=CO2+H2 (water gas shift reaction).

In the decomposer 50, the water vapor adsorption portion 55 is for suppressing the steam reforming reaction and the associated water gas shift reaction so as not to generate carbon dioxide. Water vapor is adsorbed in the water vapor adsorption portion 55. The water vapor adsorption portion 55 is formed of a material that generates heat when the water vapor is adsorbed therein. The heat generated at this time is adsorbed heat (see white arrow). The water vapor adsorption portion 55 is formed of, for example, zeolite and silica gel. The water vapor adsorption portion 55 may be formed of another material.

Function and Effect

The reciprocating engine 10 includes the re-compression stroke S4 in which a combustion gas is compressed with ascending of the piston 12, after the compression stroke S2 and the expansion stroke S3. The hydrocarbon fuel supply unit 30 supplies the hydrocarbon fuel to the decomposer 50.

The decomposer 50 decomposes the hydrocarbon fuel into carbon and a hydrogen gas utilizing the heat and the pressure of the combustion gas in the re-compression stroke S4. The decomposer 50 can efficiently decompose the hydrocarbon fuel. The carbon is stored in the decomposer 50.

The hydrogen gas supply unit 40 supplies, as fuel, the hydrogen gas produced in the decomposer 50 into the cylinder 11 of the reciprocating engine 10. The reciprocating engine 10 operates by combusting the hydrogen gas. An oxide of carbon resulted from the combustion is not generated. The reciprocating engine 10 can supply the heat and the pressure to the decomposer 50 for the decomposition of the hydrocarbon fuel while outputting the drive power for traveling a vehicle.

The fuel reforming system 1 can realize carbon neutrality. The fuel reforming system 1 utilizes the heat and the pressure derived from the reciprocating engine 10, and thus, does not require a separate dedicated device for generating the heat and/or the pressure necessary for the decomposition of the hydrocarbon fuel. The fuel reforming system 1 is useful as an on-board system mounted on a vehicle.

Further, the decomposer 50 includes the catalyst 52 to which carbon adheres and the water vapor adsorption portion 55 in which water vapor is adsorbed. Here, the water vapor is mixed in the combustion gas to be supplied to the decomposer 50 in some cases.

In the decomposer 50, since the water vapor is adsorbed in the water vapor adsorption portion 55, adsorption of the water vapor in the catalyst 52 is suppressed. In this manner, in the decomposer 50, the steam reforming reaction and the associated water gas shift reaction are suppressed, so that carbon dioxide is less likely to be generated.

As described above, generation of carbon dioxide can be suppressed in the fuel reforming system 1 mounted on a vehicle.

With the heat generated when the water vapor is adsorbed in the water vapor adsorption portion 55, the decomposition reaction that decomposes the hydrocarbon fuel into carbon and a hydrogen gas can be promoted.

Since the water vapor adsorption portion 55 is next to the catalyst 52, it is possible to urge the water vapor not to be adsorbed in the catalyst 52, but in the next water vapor adsorption portion 55.

The catalyst 52 is carried in the recess 56 on the inner surface (surface) 51*b* of the carrier 51 and the water vapor adsorption portion 55 is disposed in the projection 57 on the inner surface (surface) 51*b* of the carrier 51. By providing a step between the catalyst 52 (recess 56) and the water vapor adsorption portion 55 (projection 57), the adsorption of the water vapor in the water vapor adsorption portion 55, separated from the catalyst 52, can be more promoted, so that the adhesion of the carbon to the catalyst 52 can be more promoted.

The water vapor adsorption portion 55 in the projection 57 on the inner surface 51*b* of the cylinder-shaped carrier 51 is positioned on the inner side (the side of the gap A denoted by J) relative to the catalyst 52 in the recess 56 on the inner surface 51*b* of the cylinder-shaped carrier 51. Thus, the water vapor adsorption portion 55 contacts water vapor before the catalyst 52 contacts the water vapor. In this manner, the water vapor can be adsorbed in the water vapor adsorption portion 55 before the water vapor is adsorbed in the catalyst 52.

Second Embodiment

Figure 8:
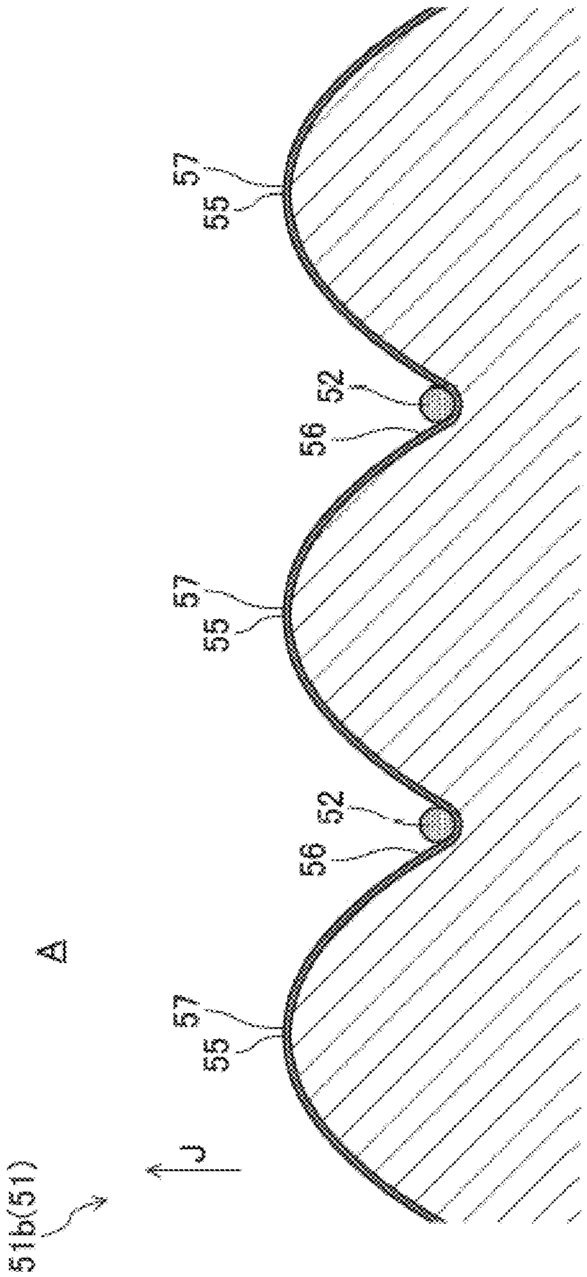
FIG. 8 schematically shows the inner surface of the carrier of the decomposer according to a second embodiment.

The fuel reforming system 1 for a vehicle according to a second embodiment will be described. In the following description, the same components as those of the aforementioned embodiment are assigned the same reference signs and the detailed descriptions are omitted in some cases. FIG. 8 schematically shows a cross section of the inner surface 51*b* of the carrier 51 of the decomposer 50 according to the second embodiment.

The carrier 51 forms the water vapor adsorption portion 55 by itself. The carrier 51 is formed of, for example, zeolite and silica gel. The water vapor adsorption portion 55 may be formed of another material.

The carrier 51 is formed in a cylinder shape. The recess 56 and the projection 57 that are next to each other are provided on the inner surface 51*b* as the surface of the carrier 51. The recess 56 and the projection 57 on the inner surface 51*b* of the carrier 51 may be formed by intentionally processing or the like or may be naturally formed as surface roughness over the course of the production.

The projection 57 on the inner surface 51*b* of the carrier 51 is exposed on the inner side (the side of the gap A denoted by J) as the water vapor adsorption portion 55. The recess 56 on the inner surface 51*b* of the carrier 51 is covered with the catalyst 52. The catalyst 52 is preferably smaller than the recess 56 on the inner surface 51*b* of the carrier 51. The catalyst 52 may cover only a part or all of the recess 56 on the inner surface 51*b* of the carrier 51.

The other configurations are the same as those of the first embodiment.

According to the present embodiment, the carrier 51 forms the water vapor adsorption portion 55, and the recess 56 and the projection 57 are provided on the inner surface (surface) 51*b*. When the catalyst 52 is intended to be disposed on the inner surface (surface) 51*b* of such a carrier 51, on the inner surface (surface) 51*b* of the carrier 51, the catalyst 52 naturally rolls into the recess 56 and the projection 57 is naturally exposed as the water vapor adsorption portion 55.

It is easier to dispose the catalyst 52 and the water vapor adsorption portion 55 on the inner surface (surface) 51*b* of the carrier 51.

Further, the water vapor adsorption portion 55 is more likely to contact the water vapor before the catalyst 52 contacts the water vapor. Therefore, the water vapor can be adsorbed in the water vapor adsorption portion 55 before the water vapor is adsorbed in the catalyst 52.

Third Embodiment

Figure 9:
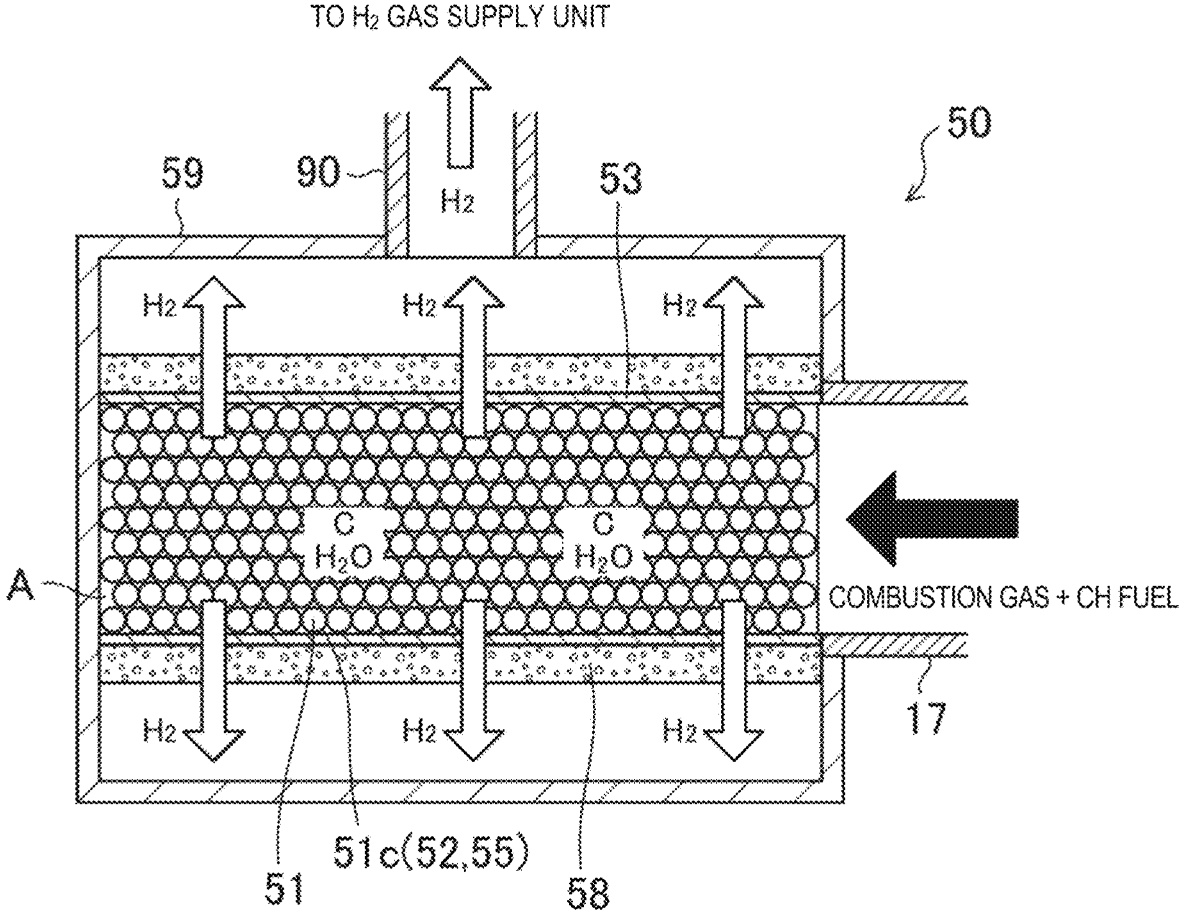
FIG. 9 shows a front-face cross-sectional view of the decomposer according to a third embodiment.

The fuel reforming system 1 for a vehicle according to a third embodiment will be described. In the following description, the same components as those of the aforementioned embodiments are assigned the same reference signs and the detailed descriptions are omitted in some cases. FIG. 9 shows a front-face cross-sectional view of the decomposer 50 according to the third embodiment.

The decomposer 50 may include a cylinder-shaped hydrogen separation membrane support body 58 (hereinafter, simply referred to as a support body 58), a plurality of ball-shaped carriers 51 filled inside the support body 58, the catalyst 52 carried on an outer surface 51*c* as a surface of the ball-shaped carrier 51, the hydrogen separation membrane 53 provided inside the support body 58, the water vapor adsorption portion 55 disposed on the outer surface 51*c* as the surface of the ball-shaped carrier 51, and a case 59 that accommodates the support body 58. The support body 58 is formed of, for example, porous ceramic (for example, zirconia). The support body 58 may be disposed on the inner side of the hydrogen separation membrane 53 (the hydrogen separation membrane 53 may be disposed on an outer side of the support body 58).

The gap A is formed between the outer surfaces (surfaces) 51*c* of the plurality of ball-shaped carriers 51. In the gap A, a hydrocarbon fuel (CH fuel), a combustion gas, and water vapor (H2O) are present.

As in the same manner as shown in FIG. 7, the recess 56 and the projection 57 that are next to each other are provided on the outer surface (surface) 51*c* of the ball-shaped carrier 51. The catalyst 52 is carried in the recess 56 on the outer surface (surface) 51*c* of the ball-shaped carrier 51. The water vapor adsorption portion 55 is disposed in the projection 57 on the outer surface (surface) 51*c* of the ball-shaped carrier 51. On the outer surface (surface) 51*c* of the ball-shaped carrier 51, the water vapor adsorption portion 55 is disposed so as to be next to the catalyst 52.

The water vapor adsorption portion 55 in the projection 57 on the outer surface (surface) 51*c* of the ball-shaped carrier 51 is positioned on the outer side (the side of the gap A, the side closer to the water vapor) relative to the catalyst 52 in the recess 56 on the outer surface (surface) 51*c* of the ball-shaped carrier 51.

Carbon adheres to the catalyst 52. Water vapor is adsorbed in the water vapor adsorption portion 55. The water vapor adsorption portion 55 is formed of a material that generates heat when the water vapor is adsorbed therein.

As in the same manner as shown in FIG. 8, the ball-shaped carrier 51 may form the water vapor adsorption portion 55 by itself. In this case, the projection 57 on the outer surface (surface) 51*c* of the ball-shaped carrier 51 is exposed on the outer side (the side of the gap A, the side closer to water vapor) as the water vapor adsorption portion 55. The recess 56 on the outer surface (surface) 51*c* of the ball-shaped carrier 51 is covered with the catalyst 52.

The other configurations are the same as those of the first and the second embodiments.

Fourth Embodiment

Figure 10:
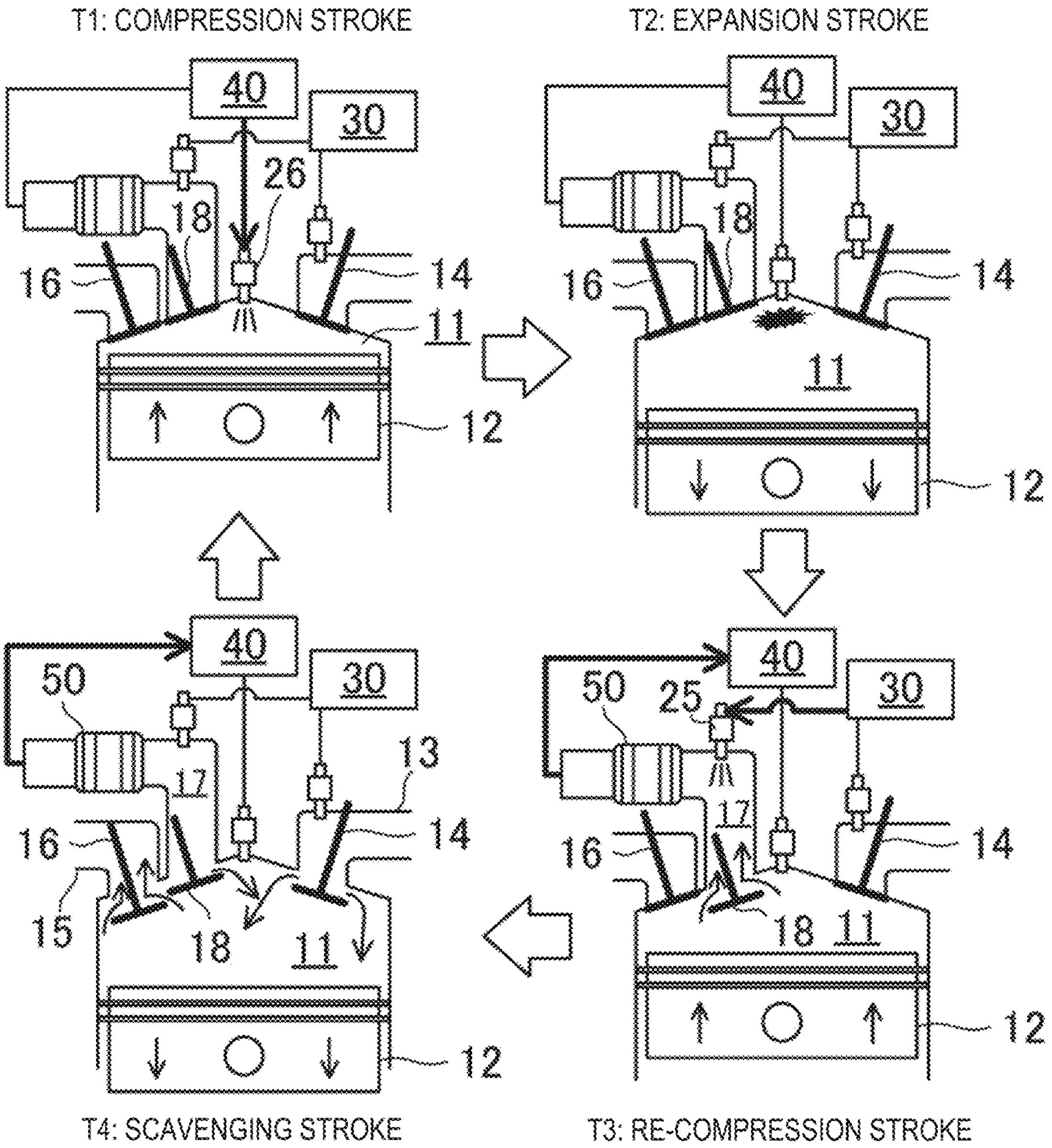
FIG. 10 shows each stroke of an irregular four-stroke cycle according to a fourth embodiment.

The fuel reforming system 1 for a vehicle according to a fourth embodiment will be described. In the following description, the same components as those of the aforementioned embodiments are assigned the same reference signs and the detailed descriptions are omitted in some cases. FIG. 10 shows each stroke of an irregular four-stroke cycle according to the fourth embodiment.

The reciprocating engine 10 performs the irregular four-stroke cycle. The irregular four-stroke cycle includes a compression stroke T1 in which an air-fuel mixture containing a hydrogen gas inside the cylinder 11 is compressed with ascending of the piston 12, an expansion stroke T2 in which the piston 12 descends with the combustion of the air-fuel mixture, a re-compression stroke T3 in which a combustion gas is compressed with ascending of the piston 12, and a scavenging stroke T4 in which an exhaust gas inside the cylinder 11 is discharged through the exhaust port 15 and intake air is introduced into the cylinder 11 through the intake port 13 with descending of the piston 12.

The other configurations are the same as those of the first to third embodiments.

OTHER EMBODIMENTS

The present disclosure has been described above with preferable embodiments, but these descriptions are not limitations and it goes without saying that various modifications, replacements, or combinations are available.

On the surfaces 51_b_, 51_c_ of the carrier 51, the catalyst 52 may be carried in the projection 57 and the water vapor adsorption portion 55 may be disposed in the recess 56.

The surfaces 51_b_, 51_c_ of the carrier 51 may be flat and may not be provided with the recess 56 or the projection 57. The water vapor adsorption portion 55 may not be next to the catalyst 52. The water vapor adsorption portion 55 may be disposed separately from the carrier 51, instead of being disposed on the surfaces 51_b_, 51_c_ of the carrier 51.

The carrier may be, for example, in a plate shape. In this case, it is preferable that the hydrogen separation membrane is inserted between the inner surfaces of two plate-shaped carriers and the catalyst and the water vapor adsorption portion are disposed (carried) on the inner surfaces of the plate-shaped carriers. The decomposer 50 may be in any structure as long as it can decompose a hydrocarbon fuel utilizing the heat and the pressure of a combustion gas.

The reciprocating engine 10 may perform a cycle other than the six-stroke cycle and the irregular four-stroke cycle. The cycle may only need to include at least the compression stroke, the expansion stroke, and the re-compression stroke.

The reciprocating engine 10 may be a compression-ignition engine.

REFERENCE SIGNS LIST

S1 intake stroke
S2 compression stroke
S3 expansion stroke
S4 re-compression stroke
S5 re-expansion stroke
S6 exhaust stroke
T1 compression stroke
T2 expansion stroke
T3 re-compression stroke
T4 scavenging stroke
A gap
J inner side
1 fuel reforming system
10 reciprocating engine
11 cylinder
12 piston
17 reforming port
18 on-off valve
25 reforming port injector
26 hydrogen injector
30 hydrocarbon fuel supply unit
40 hydrogen gas supply unit
50 decomposer
51 carrier
51_a_ outer surface
51_b_ inner surface (surface)
51_c_ outer surface (surface)
52 catalyst
53 hydrogen separation membrane
53_a_ outer surface
53_b_ inner surface
54 case
55 water vapor adsorption portion
56 recess
57 projection
58 support body
70 carbon recovery unit
71 housing
72 discharge passage
73 discharge valve
74 discharge hole

The invention claimed is:

1. A fuel reforming system for a vehicle, the fuel reforming system comprising:
- a reciprocating engine including a cylinder and a piston configured to reciprocate within the cylinder, and being configured to perform a cycle including a compression stroke, an expansion stroke after ignition of an air-fuel mixture, and a re-compression stroke in which a combustion gas remaining after the expansion stroke is compressed by upward movement of the piston;
- a decomposer fluidly connected to the cylinder and configured to receive, during the re-compression stroke, the combustion gas compressed in the cylinder together with a hydrocarbon fuel supplied to the decomposer;
- a hydrocarbon fuel supply that supplies the hydrocarbon to the decomposer; and
- a hydrogen gas supply configured to supply hydrogen gas generated by the decomposer to the cylinder as a fuel for the reciprocating engine;
- wherein the decomposer includes:
  - a catalyst configured to cause carbon contained in the hydrocarbon fuel to adhere to the catalyst while generating hydrogen gas from the hydrocarbon fuel; and
  - a water vapor adsorption portion configured to adsorb water vapor contained in the combustion gas and disposed before the water vapor reaches the catalyst:
- wherein the decomposer is configured, during the re-compression stroke, to decompose the hydrocarbon fuel using heat and pressure of the combustion gas while suppressing generation of carbon dioxide by reducing availability of water vapor at the catalyst due to adsorption by the water vapor adsorption portion.

2. The fuel reforming system for a vehicle according to claim 1, wherein the water vapor adsorption portion is formed of a material that generates heat in response to adsorption of the water vapor therein.

3. The fuel reforming system for a vehicle according to claim 2, wherein the water vapor adsorption portion is disposed next to the catalyst.

4. The fuel reforming system for a vehicle according to claim 3, wherein
- the decomposer includes a carrier,
- a recess and a projection that is next to the recess are provided on a surface of the carrier,
- the catalyst is carried in one of the recess and the projection, and
- the water vapor adsorption portion is disposed in another of the recess and the projection.

5. The fuel reforming system for a vehicle according to claim 4, wherein
- the carrier has a cylinder shape and carries the catalyst on an inner surface of the cylinder shape,
- the recess and the projection are provided on the inner surface, and
- the water vapor adsorption portion is positioned on an inner side relative to the catalyst.

6. The fuel reforming system for a vehicle according to claim 4, wherein
- the carrier forms the water vapor adsorption portion,
- the projection is exposed as the water vapor adsorption portion, and
- the recess is covered with the catalyst.

7. The fuel reforming system for a vehicle according to claim 1, wherein the water vapor adsorption portion is disposed next to the catalyst.

8. The fuel reforming system for a vehicle according to claim 7, wherein the decomposer includes a carrier, a recess and a projection that is next to the recess are provided on a surface of the carrier, the catalyst is carried in one of the recess and the projection, and the water vapor adsorption portion is disposed in another of the recess and the projection.

9. The fuel reforming system for a vehicle according to claim 8, wherein the carrier has a cylinder shape and carries the catalyst on an inner surface of the cylinder shape, the recess and the projection are provided on the inner surface, and the water vapor adsorption portion is positioned on an inner side relative to the catalyst.

10. The fuel reforming system for a vehicle according to claim 8, wherein the carrier forms the water vapor adsorption portion, the projection is exposed as the water vapor adsorption portion, and the recess is covered with the catalyst.

* * * * *